US008830147B2

(12) United States Patent
Shikina et al.

(10) Patent No.: US 8,830,147 B2
(45) Date of Patent: Sep. 9, 2014

(54) DISPLAY APPARATUS AND ELECTRONIC DEVICE USING THE SAME

(75) Inventors: Noriyuki Shikina, Yokohama (JP); Hideo Mori, Yokohama (JP); Tatsuhito Goden, Kawasaki (JP); Somei Kawasaki, Saitama (JP); Masami Iseki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 921 days.

(21) Appl. No.: 12/444,082

(22) PCT Filed: Jun. 17, 2008

(86) PCT No.: PCT/JP2008/061382

§ 371 (c)(1), (2), (4) Date: Apr. 2, 2009

(87) PCT Pub. No.: WO2008/156188

PCT Pub. Date: Dec. 24, 2008

(65) Prior Publication Data

US 2010/0026677 A1 Feb. 4, 2010

(30) Foreign Application Priority Data

Jun. 19, 2007 (JP) ................................ 2007-161208

(51) Int. Cl.
*G09G 3/36* (2006.01)
*G09G 5/00* (2006.01)
*G06F 3/038* (2013.01)
*G09G 3/32* (2006.01)

(52) U.S. Cl.
CPC ........ *G09G 3/325* (2013.01); *G09G 2300/0842* (2013.01); *G09G 3/3266* (2013.01); *G09G 2320/0247* (2013.01); *G09G 2300/0861* (2013.01)
USPC ................................ 345/77; 345/76; 345/204

(58) Field of Classification Search
USPC .................... 345/76–83, 204–215, 690–699; 315/169.1–169.4
See application file for complete search history.

(56) References Cited

U.S. PATENT DOCUMENTS 5,302,871 A 4/1994 Matsuzaki et al.
5,963,184 A 10/1999 Tokunaga et al. ............... 345/60

(Continued)

FOREIGN PATENT DOCUMENTS

CN 1521719 A 8/2004
CN 1770246 A 5/2006

(Continued)

OTHER PUBLICATIONS

International Search Report and Written Opinion in PCT/JP2008/061382.

(Continued)

*Primary Examiner* — Alexander Eisen
*Assistant Examiner* — Patrick F Marinelli
(74) *Attorney, Agent, or Firm* — Fitzpatrick, Cella, Harper & Scinto

(57) ABSTRACT

A display apparatus includes a plurality of light emitting devices arranged in row and column directions, drive circuits for driving the light emitting devices, a plurality of scanning lines and a plurality of lighting lines connecting the drive circuits in the row direction, a plurality of data lines connecting the drive circuits in the column direction, and a control circuit for controlling the scanning lines, the lighting lines, and the data lines. The control circuit performs at least twice, while performing a first programming scanning and a second programming scanning respectively once, a light emitting scanning in which the plurality of lighting lines are sequentially selected and currents corresponding to the signals set to the drive circuits are supplied from the drive circuit connected to the selected lighting lines to the light emitting devices. In addition, the control circuit varies the length of a period for which the currents are supplied from the drive circuits connected to the selected lighting lines to the light emitting devices every time the light emitting scanning is performed at least twice.

7 Claims, 7 Drawing Sheets

(56) References Cited

U.S. PATENT DOCUMENTS

| | | | |
|---|---|---|---|
| 6,188,378 B1 | 2/2001 | Yamamoto et al. | 345/101 |
| 6,335,720 B1 | 1/2002 | Mori et al. | 345/98 |
| 6,348,910 B1 | 2/2002 | Yamamoto et al. | 345/102 |
| 6,373,454 B1 | 4/2002 | Knapp et al. | |
| 6,552,709 B1 | 4/2003 | Yamaguchi | |
| 6,559,824 B1 | 5/2003 | Kubota et al. | |
| 6,587,086 B1 | 7/2003 | Koyama | |
| 6,661,180 B2 | 12/2003 | Koyama | |
| 7,126,565 B2 | 10/2006 | Kawasaki et al. | |
| 7,242,397 B2 | 7/2007 | Iseki et al. | 345/204 |
| 7,253,812 B2 | 8/2007 | Sasaki | |
| 7,259,735 B2 | 8/2007 | Kasai | 345/77 |
| 7,532,207 B2 | 5/2009 | Kawasaki et al. | 345/204 |
| 7,605,899 B2 | 10/2009 | Shikina et al. | |
| 7,692,643 B2 | 4/2010 | Kawasaki et al. | |
| 7,812,812 B2 | 10/2010 | Yoshinaga et al. | |
| 7,817,114 B2 | 10/2010 | Iseki et al. | |
| 7,872,617 B2 | 1/2011 | Yamashita et al. | |
| 7,903,053 B2 | 3/2011 | Kawasaki et al. | |
| 7,911,425 B2 | 3/2011 | Goden et al. | |
| 7,969,392 B2 | 6/2011 | Yamashita et al. | |
| 8,154,539 B2 | 4/2012 | Kawasaki et al. | |
| 8,159,482 B2 | 4/2012 | Kawasaki et al. | |
| 8,159,489 B2 | 4/2012 | Nakamura et al. | |
| 8,248,332 B2 | 8/2012 | Kawasaki et al. | |
| 8,305,325 B2 | 11/2012 | Kawasaki et al. | |
| 8,339,336 B2 | 12/2012 | Goden et al. | |
| 8,354,981 B2 | 1/2013 | Kawasaki et al. | |
| 8,395,570 B2 | 3/2013 | Maru et al. | |
| 2002/0047581 A1 | 4/2002 | Koyama | |
| 2003/0058687 A1 | 3/2003 | Kimura | |
| 2004/0155843 A1 | 8/2004 | Sasaki | |
| 2004/0183752 A1 | 9/2004 | Kawasaki et al. | |
| 2005/0007316 A1 | 1/2005 | Akimoto et al. | |
| 2005/0007319 A1* | 1/2005 | Shin et al. | 345/76 |
| 2005/0041002 A1 | 2/2005 | Takahara et al. | 345/76 |
| 2005/0122150 A1 | 6/2005 | Iseki et al. | |
| 2005/0285151 A1 | 12/2005 | Kawasaki | |
| 2006/0061529 A1 | 3/2006 | Kim | |
| 2006/0114194 A1 | 6/2006 | Kawasaki et al. | 345/76 |
| 2006/0114195 A1 | 6/2006 | Yamashita et al. | 345/76 |
| 2006/0132395 A1 | 6/2006 | Kawasaki et al. | 345/75.2 |
| 2006/0187185 A1 | 8/2006 | Yoshinaga et al. | 345/107 |
| 2006/0267509 A1 | 11/2006 | Yang | 315/169.3 |
| 2007/0132719 A1 | 6/2007 | Yamashita et al. | 345/156 |
| 2007/0257867 A1 | 11/2007 | Kasai | 345/77 |
| 2007/0257868 A1 | 11/2007 | Kasai | 345/77 |
| 2007/0279343 A1* | 12/2007 | Kim | 345/77 |
| 2008/0007494 A1 | 1/2008 | Kim et al. | |
| 2008/0157828 A1 | 7/2008 | Kawasaki et al. | 327/108 |
| 2008/0158112 A1 | 7/2008 | Kawasaki et al. | 345/76 |
| 2008/0259000 A1 | 10/2008 | Kawasaki | |
| 2009/0015571 A1 | 1/2009 | Kawasaki et al. | 345/204 |
| 2009/0033599 A1 | 2/2009 | Kawasaki et al. | 345/76 |
| 2009/0066615 A1 | 3/2009 | Kawasaki | 345/77 |
| 2009/0085908 A1 | 4/2009 | Kawasaki et al. | |
| 2009/0102853 A1 | 4/2009 | Kawasaki et al. | |
| 2009/0109144 A1 | 4/2009 | Goden et al. | |
| 2009/0121980 A1 | 5/2009 | Kawasaki et al. | |
| 2009/0135110 A1 | 5/2009 | Nakamura et al. | |
| 2009/0231239 A1* | 9/2009 | Goden et al. | 345/76 |
| 2009/0289966 A1 | 11/2009 | Ikeda et al. | |
| 2010/0026677 A1 | 2/2010 | Shikina et al. | |
| 2010/0045646 A1 | 2/2010 | Kishi | |
| 2010/0073267 A1 | 3/2010 | Akimoto et al. | |
| 2010/0128160 A1 | 5/2010 | Maru et al. | |
| 2010/0328365 A1 | 12/2010 | Ikeda et al. | |
| 2011/0001689 A1 | 1/2011 | Maru et al. | |
| 2011/0025653 A1 | 2/2011 | Ikeda et al. | |
| 2011/0090210 A1 | 4/2011 | Sasaki et al. | |

FOREIGN PATENT DOCUMENTS

| | | | |
|---|---|---|---|
| EP | 1 429 312 | | 6/2004 |
| JP | 11-282417 | A | 10/1999 |
| JP | 2001-134229 | A | 5/2001 |
| JP | 2001-159877 | A | 6/2001 |
| JP | 2003-271095 | A | 9/2003 |
| JP | 2004-294850 | A | 10/2004 |
| JP | 2004-3411144 | A | 12/2004 |
| JP | 2005-151015 | A | 6/2005 |
| JP | 2006-030516 | A | 2/2006 |
| JP | 2005-157322 | A | 6/2006 |
| JP | 2008-268981 | A | 11/2008 |
| JP | 2008-015516 | A | 12/2008 |
| JP | 2009-008799 | A | 1/2009 |
| WO | WO 2007116950 | A1 * | 10/2007 |
| WO | 2008/108024 | A | 9/2008 |

OTHER PUBLICATIONS

Somei Kawasaki et al., U.S. Appl. No. 12/164,542, filed Jun. 30, 2008.
Tatsuhito Goden et al., U.S. Appl. No. 12/235,052, filed Sep. 22, 2008.
Tatsuhito Goden et al., U.S. Appl. No. 12/256,919, filed Oct. 23, 2008.
Kouji Ikeda et al., U.S. Appl. No. 12/520,726, filed Jun. 22, 2009.
Kouji Ikeda et al., U.S. Appl. No. 12/795,137, filed Jun. 7 2010.
Hiroyuki Maru et al., U.S. Appl. No. 12/823,235, filed Jun. 25, 2010.
Kouji Ikeda et al., U.S. Appl. No. 12/820,498, filed Jun. 22, 2010.
Somei Kawasaki, U.S. Appl. No. 12/091,230, filed Apr. 23, 2008.
Somei Kawasaki, U.S. Appl. No. 12/063,306, filed Feb. 8, 2008.
Tatsuhito Goden, U.S. Appl. No. 11/917,068, filed Dec. 10, 2007.
Somei Kawasaki, U.S. Appl. No. 11/943,041, filed Nov. 20, 2007.
Kouji Ikeda, et al., U.S. Appl. No. 13/251,525, filed Oct. 3, 2011.
Somei Kawasaki et al., U.S. Appl. No. 12/182,582, filed Jul. 30, 2008.

* cited by examiner

DISPLAY APPARATUS AND ELECTRONIC DEVICE USING THE SAME

TECHNICAL FIELD

The present invention relates to a display apparatus using a light emitting device such as an electro-luminescence (EL) device and an electronic device using the same.

BACKGROUND ART

In recent years, attention has been paid to a self light emitting display using a light emitting device as a next generation display. Among other things, there has been known a display using an organic EL device, i.e., an organic EL display, being a current-control light emitting device whose light emitting brightness is controlled by current. As the organic EL display, there is an active-matrix organic EL display using a thin film transistor (TFT) in its display area and peripheral circuit. As one of its driving systems, there has been used a current programming method in which the magnitude of current corresponding to image data is set to a pixel circuit formed in a pixel to emit the organic EL device.

FIG. 9 is one example of the configuration of a pixel circuit in a conventional current programming method including an organic EL device. In FIG. 9, scanning signals P1 and P2 and current data Idata as a data signal are input to the pixel circuit. The anode of the organic EL device is connected to the drain terminal of a TFT (M4) and the cathode of the organic EL device is connected to a ground potential CGND. P-type TFTs M1, M2 and M4 and N-type TFT M3 are included in the pixel circuit.

FIG. 10 is a timing chart illustrating the drive operation of a pixel circuit 2. Idata denotes a current data. That is to say, I(i−1), I(i) and I(i+1) illustrate current data Idata input to the pixel circuits 2 in the subject column in an (i−1) row (or, a row preceding by one row with respect to a subject row), "i" row (or, a subject row) and (i+1) row (or, a row following the subject row). P1 and P2 are scanning signals.

Before a time t0, a signal with a low level is input as the scanning signal P1 to the pixel circuits 2 in a subject row and a signal with a high level is input as the scanning signal P2 thereto. The transistor M2 is turned off, the transistor M3 is turned off and the transistor M4 is turned on. In this state, the current data I (m−1) corresponding to the current data Idata in the row preceding by one row is not input to the pixel circuit 2 in the "m" row being the subject row.

At the time t0, a signal with a high level is input as the scanning signal P1 and a signal with a low level is input as the scanning signal P2. The transistors M2 and M3 are turned on and the transistor M4 is turned off. In this state, the current data I (m) corresponding to the current data Idata in the corresponding row is input to the pixel circuits 2 in the "m" row. At this point, the M4 is not in the conductive state, so that current does not flow into the organic EL device. The input Idata produces a voltage according to the current drive capacity of the transistor M1 across a capacitor C1 arranged between the gate terminal of the M1 and a power source potential VCC.

At a time t1, a signal with a high level is input as the scanning signal P2. The transistor M2 is turned off. At a time t2, a signal with a low level is input as the scanning signal P1. The transistor M3 is turned off. The transistor M4 is turned on. In this state, the transistor M4 is in the conductive state, so that the voltage produced across the capacitor C1 supplies the organic EL device with current according to the current drive capacity of the transistor M1. This causes the organic EL device to emit light having a brightness according to a supplied current.

However, a current flowing into the organic EL device in one pixel is minute and, in particular, the current data Idata for causing the device to emit light having a low brightness is extremely small. For this reason, it takes a very long time to charge a data line at the time of programming a desired current, so that one scanning period (or, a period for which the scanning signal P2 is in a low level from the time t0 to the time t1) is too short to charge the data line. Then, there has been known a duty driving in which a comparatively large current is set to a pixel circuit to control a light emitting period, thereby controlling a brightness, however, the flicker is produced unless the pixel circuit is driven at a high frequency to some extent.

For this reason, U.S. Patent Application Publication No. 2005/0007319 proposes a display apparatus in which a light emitting period is controlled by the duty driving while a display is being performed by the interlace method in which one frame is formed of two fields (or, odd and even fields).

FIG. 11 is a timing chart describing a method of driving the display apparatus disclosed in the above document. In FIG. 11, one frame ("1 frame" in the figure) is formed of an odd field (or, "ODD field" in the figure) and an even field (or, "EVEN field" in the figure). A row number of the display apparatus is represented by 1 to m.

In FIG. 11, X(1) to X(m) represent scanning signals corresponding to each row and select rows when they are in a high level state to perform a current programming. Z(1) to Z(m) denote lighting signals corresponding to each row. A pixel emits light when the signal is in a low level state, but it does not emit when the signal is in a high level state. In the odd field, only odd rows are selected to perform the current programming. In the even field, only even rows are selected to perform the current programming.

Thus, the control lines corresponding to odd lines and even lines are separated from each other and driven and the organic EL devices are duty-driven, thereby making the light emitting and the non-light emitting periods between adjacent lines different to remove the flicker.

For example, if one field is displayed at 60 Hz using the driving method of the above document, one frame is displayed at 30 Hz. That is to say, a driving frequency is 30 Hz at which light emitting and non-light emitting is repeated on a certain line, this frequency is not enough to prevent the flicker from being produced. As a result, an image quality is degraded.

DISCLOSURE OF THE INVENTION

It is an aspect of the invention to provide a display device capable of suppressing a flicker to attain a good display and an electronic device using the same.

A display apparatus according to the present invention includes: a plurality of light emitting devices arranged in row and column directions; drive circuits for driving the light emitting devices; a plurality of scanning lines and a plurality of lighting lines connecting the drive circuits in the row direction; and a plurality of data lines connecting the drive circuits in the column direction; wherein, in a period for which a programming scanning, in which the plurality of scanning lines are sequentially selected and signals are set to the drive circuits connected to the selected scanning lines, is performed throughout the plurality of scanning lines, the light emitting scanning in which the plurality of lighting lines are sequentially selected and currents corresponding to the signals set to the drive circuits are supplied from the drive circuit connected to the selected lighting lines to the light emitting devices, is performed at least twice, and the length of a period for which the currents are supplied from the drive circuits connected to the selected lighting lines to the light emitting devices varies in every period of the light emitting scanning.

According to the present invention, a light emitting scanning in which a light emitting device is supplied with current corresponding to a set signal for a constant period of time is repeated twice or more during a period for which a programming scanning for setting a signal to a drive circuit is performed on all scanning lines. For that reason, if a drive frequency for one field is taken as 60 Hz in the interlace scanning, scanning across all scanning lines is performed over a period of two fields, that is, at a period of 30 Hz, but light can be emitted at 60 times or more per second. For a progressive scanning in which all scanning lines are sequentially scanned in one field without using the interlace scanning, all scanning lines are scanned in one field (30 Hz), during which a light emitting scanning is performed twice or more, so that a light emitting frequency is increased to 60 Hz or more.

In the present invention, in terms of one row, a period for which current is supplied is different in length between a light emitting scanning immediately after the programming scanning has been performed and a light emitting scanning after that. For this reason, even if a current output in the following field in which current is set to the pixel circuit produces an error as compared with the set current, the same value can be obtained as an apparent brightness.

Thus, in the present invention, a drive frequency for light emitting and non-light emitting can be two times or more higher than a frequency at which current is set to the drive circuit to obtain the same brightness in each field, allowing suppressing the occurrence of the flicker.

The present invention relates to a current or a voltage programming apparatus, an active matrix display apparatus and a current supply method for these apparatus, and is suitably applicable to an active matrix display apparatus using a current-driven display device in particular. The use of the display apparatus can form an information display apparatus, for example. The information display apparatus may be, for example, a cellular phone, a portable computer, a still camera or a video camera. In addition, the present invention may be used in a system having a plurality of the functions of the above apparatus.

Further features of the present invention will become apparent from the following description of exemplary embodiments with reference to the attached drawings.

BEST MODE FOR CARRYING OUT THE INVENTION

The exemplary embodiments of the present invention are described in detail below with reference to the drawings. The present invention is suitably applicable particularly to an active matrix display apparatus using an organic EL device and performs a light emitting period control while performing a current programming in the interlace method.

Although the following is the description of an embodiment in which a display apparatus using the organic EL device is taken as an example, the present invention is not limited to this embodiment, but applicable to an apparatus in which the display of each pixel is controlled by a current signal.

First Embodiment

Figure 1:
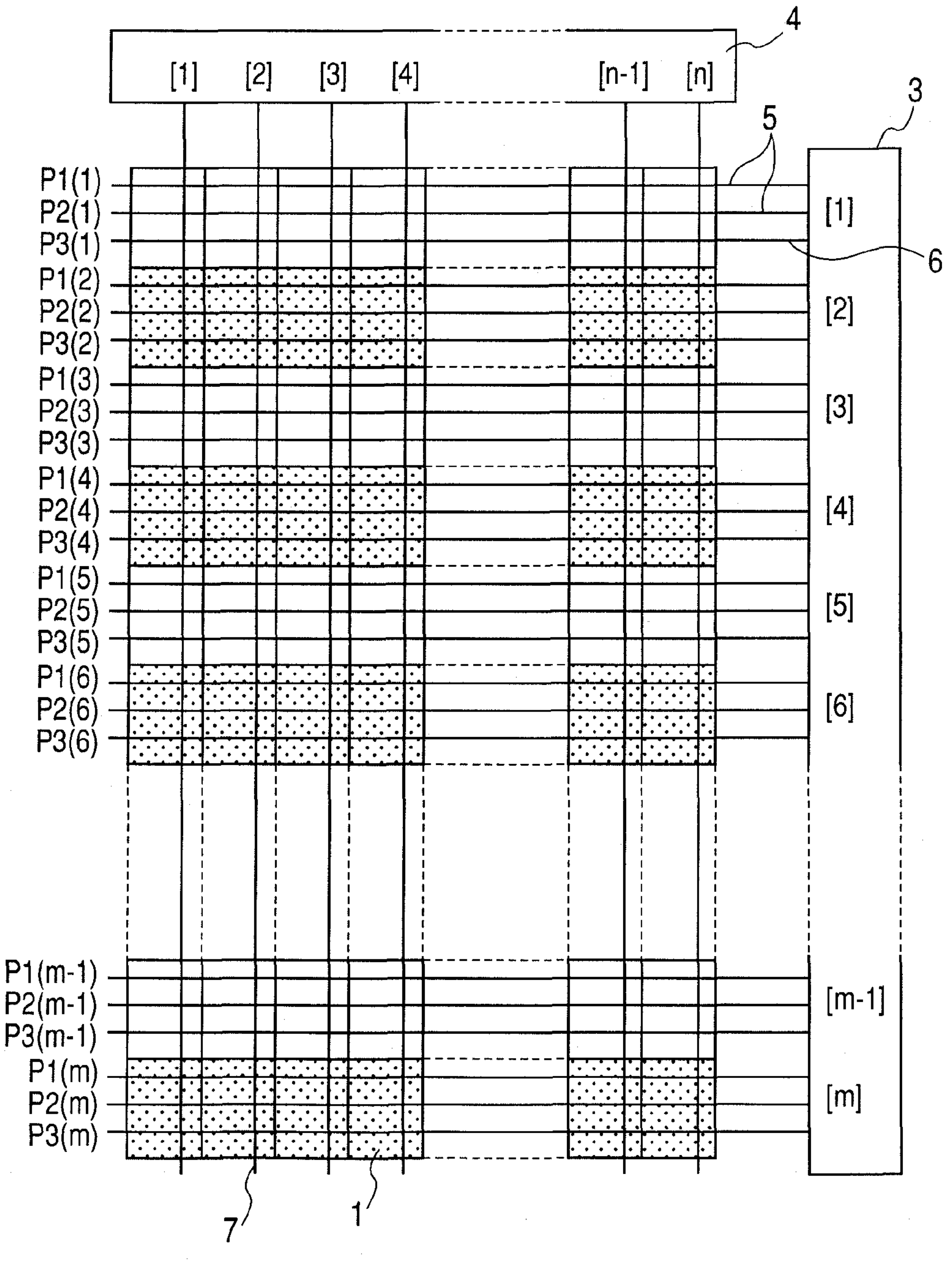
FIG. 1 is a block diagram illustrating a first embodiment of the display apparatus according to the present invention.

FIG. 1 is a block diagram illustrating the configuration of the first embodiment of a display apparatus according to the present invention. A pixel 1 in the figure includes organic EL devices for the number of RGB primary colors and a pixel circuit with TFTs for controlling current input to the organic EL devices. The pixel 1 is arranged two dimensionally in a form of "m" rows×"n" columns to form a display area. Where, "m" is an even number and "n" is a natural number.

A row control circuit 3 and a column control circuit 4 are arranged at the periphery of the display area. The output terminals of the row control circuit 3 output scanning signals P1(1) to P1(*m*) and P2(1) to P2(*m*) and lighting signals P3(1) to P3(*m*), respectively. The scanning signal is input to the pixel circuit 2 of each row through a scanning line 5.

The lighting signal is input to the pixel circuit 2 of each row through a lighting line 6. A video image signal is input to the column control circuit 4 and current data Idata is output from each output terminal of the column control circuit 4. The current data Idata is input to the pixel circuit of each column through a data line 7.

When a current programming is thus performed by the interlace method, one frame is formed of two fields of an odd and an even field. In the odd field, pixels 1 in the first, the third, the fifth, and the (m−1)th row being odd rows are sequentially selected. In the even field, pixels 1 in the second, the fourth, the sixth and the m-th row being even rows are sequentially selected.

Figure 2:
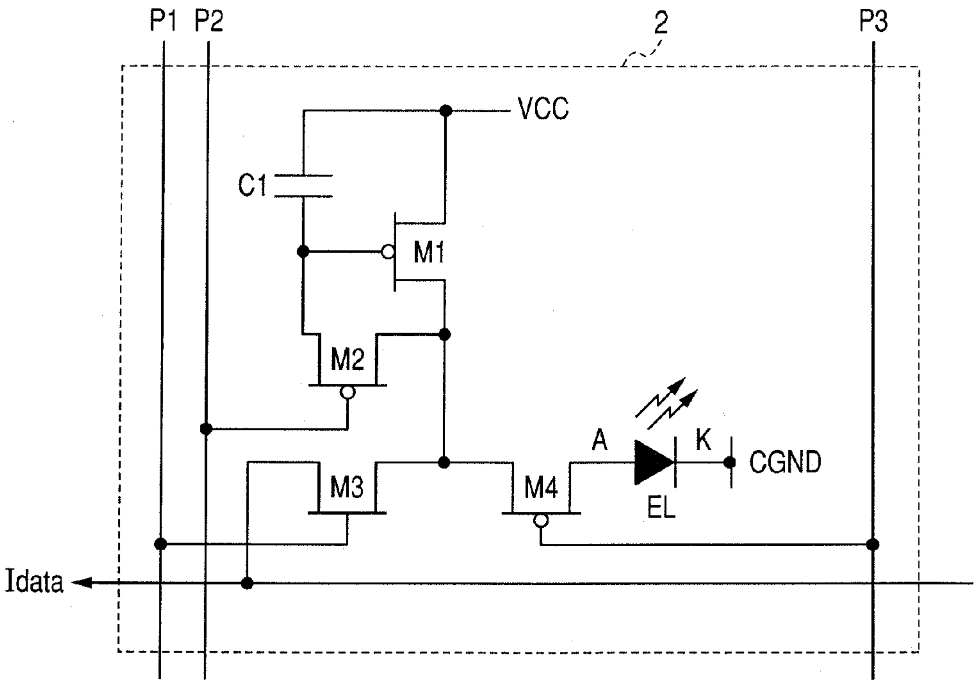
FIG. 2 is a circuit diagram illustrating one example of a pixel circuit of the display apparatus in FIG. 1.

FIG. 2 illustrates an example of the configuration of a pixel circuit 2 including an organic EL device. In FIG. 2, P1 and P2 are scanning signals and P3 is a lighting signal. The current data Idata is input to the pixel circuit 2 as a data signal. The anode of the organic EL device is connected to the drain terminal of a TFT (M4) and the cathode thereof is connected to a ground potential CGND. P-type TFTs M1, M2 and M4 and N-type TFT M3 are included in the pixel circuit.

Figure 3:
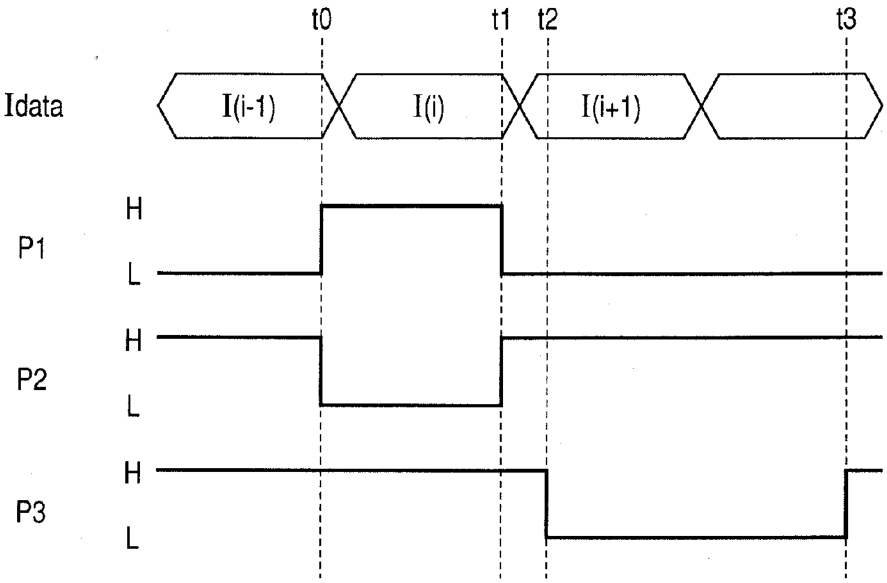
FIG. 3 is a timing chart illustrating the operation of the pixel circuit in FIG. 2.

FIG. 3 is a timing chart illustrating the drive operation of the pixel circuit 2. Idata denotes current data. I (i−1), I (i) and I (i+1) represent current data Idata input to the pixel circuits 2 in the subject column in an (i−1) row (or, a row preceding by one row with respect to a subject row), "I" row (or, a subject row) and (i+1) row (or, a row following the subject row) on a field basis.

P1 and P2 are scanning signals and P3 is a lighting signal.

Before a time t0, a signal with a low level is input as the scanning signal P1 to the pixel circuit 2 in the subject row and a signal with a high level is input as the scanning signal P2 thereto. A signal with a high level is input as the lighting signal P3 thereto.

At this point, the transistor M2 is turned off, the transistor M3 is turned off and the transistor M4 is turned off. In this state, the current data I (i−1) corresponding to the current data Idata in the row preceding by one row is not input to the pixel circuit 2 in the "m" row being the subject row.

At the time t0, a signal with a high level is input as the scanning signal P1 and a signal with a low level is input as the scanning signal P2. The transistors M2 and M3 are turned on and the transistor M4 is turned off. In this state, the current data I (i) corresponding to the current data Idata in the corresponding row is input to the pixel circuits 2 in the "m" row. At this point, the lighting signal P3 keeps the high level and the transistor M4 is not in the conductive state, so that current does not flow into the organic EL device.

The input current data Idata produces a voltage according to the current drive capacity of the transistor M1 across a capacitor C1 arranged between the gate terminal of the M1 and a power source potential VCC. The term "current programming" refers to determining the voltage on the gate terminal for causing the Idata to flow, to cause the capacitor C1 to hold the voltage.

At a time t1, a signal with a low level is input as the scanning signal P1 and a signal with a high level is input as the scanning signal P2. The transistors M2 and M3 are turned off. At a time t2, a signal with a low level is input as the lighting signal P3 and the transistor M4 is turned on. In this state, the transistor M4 is in the conductive state, so that the voltage produced across the capacitor C1 supplies the organic EL device with a current corresponding to the current drive capacity of the transistor M1. This causes the organic EL device to emit light having a brightness according to the supplied current.

At a time t3, a signal with a high level is input as the lighting signal P3 and the transistor M4 is turned off to stop the supply of current to the organic EL device, rendering the organic EL device in a non-light emitting state. The lighting signal P3 varies the period of the low level (or, the period from the time t2 to the time t3) to control the light emitting period, thereby controlling the brightness of the organic EL device.

A period in which the scanning signal P1 is in a high level from the time t0 to the time t1 is taken as one horizontal scanning period. Although the configuration in FIG. 2 is taken as an example of a pixel circuit in the present embodiment, but the present invention is not limited to this embodiment.

Figure 4:
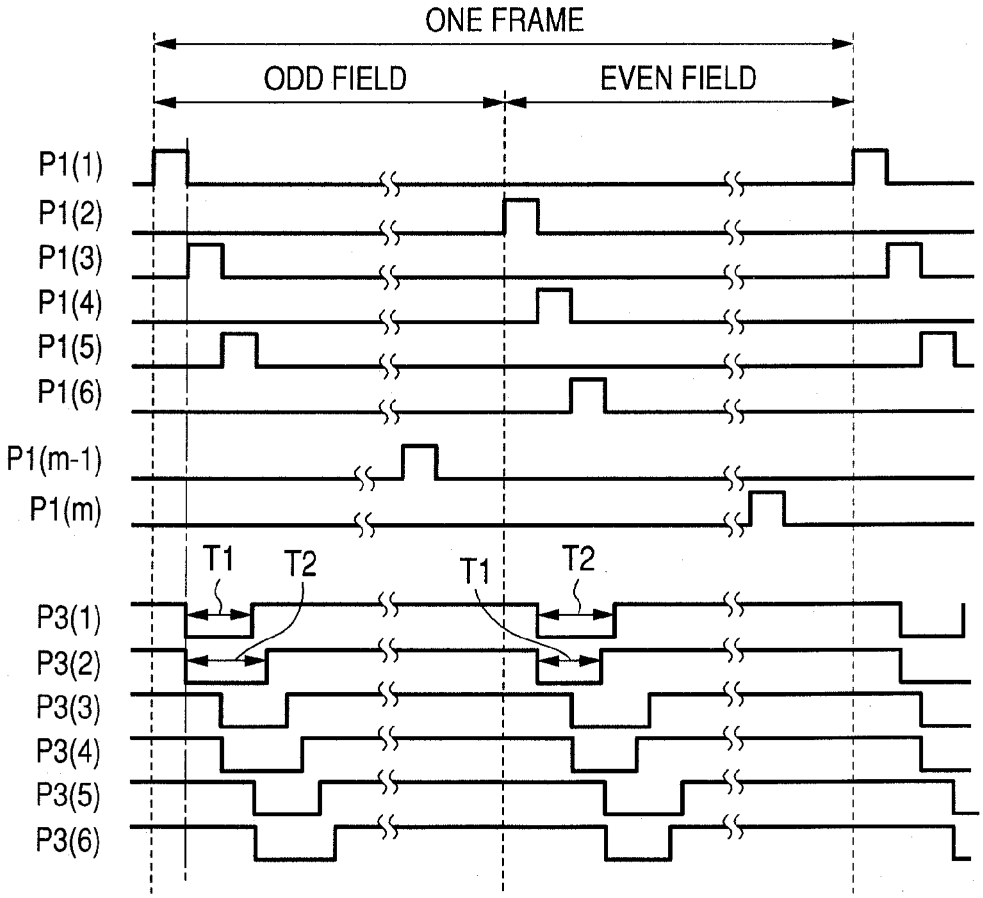
FIG. 4 is a timing chart illustrating the operation of the display apparatus in FIG. 1.

FIG. 4 is a timing chart illustrating the drive operation of the display apparatus according to the present embodiment. In FIG. 4, P1(1) to P1(*m*) illustrate scanning signals P1 corresponding to the first row to the m-th row respectively. P3(1) to P3(*m*) illustrate lighting signals P3 corresponding to the first row to the m-th row respectively.

For the sake of simplicity of the figure, although not illustrated, the scanning signals P2 are output in the same timing as that in P3 in FIG. 3.

In the present invention, an image is displayed by the interlace method, so that one frame ("one frame" in the figure) is formed of an odd field ("ODD field" in the figure) and an even field ("EVEN field" in the figure).

In the odd field, the scanning signals P1(1), P1(3), P1(5), . . . , and P1(*m*−1) in the first, the third, the fifth, . . . , and the (m−1)th row being odd rows are sequentially placed in a high level. That is to say, the current data Idata is input only to the pixel circuits 2 in the odd rows to perform the current programming.

In the even field, the scanning signals P1(2), P1(4), P1(6), . . . , and P1(*m*) in the second, the fourth, the sixth, . . . , and the m-th row being even rows are sequentially placed in a high level. That is to say, the current data Idata is input only to the pixel circuits 2 in the even rows to perform the current programming.

Hereinafter, the operation in which the scanning signal P1 is placed in a high level in the odd and the even field to select the row and current data is programmed is referred to as "programming scanning" or "first scanning."

The lighting signal P3 is described below. The lighting signals P3 in the odd rows are placed in a low-level period (T1) for a certain period in the odd field after the current programming has been performed. The lighting signals P3 are placed in a low-level period (T2) in the even field after the current programming has been performed in the following row.

The lighting signals P3 in the even rows are placed in a low-level period (T1) for a certain period in the even field after the current programming has been performed. The lighting signals P3 are placed in a low-level period (T2) in the even field after the current programming (the first scanning) has been performed in the preceding row.

Such an operation that the lighting signal is placed in a low level for a certain period to cause the organic EL device to emit light and scanning is sequentially shifted on a horizontal-scanning-period basis to a neighboring row is hereinafter referred to as "light emitting scanning" or "second scanning." A light emitting scanning is an operation in which a bright stripe is moved from an upper portion to a lower portion on a display apparatus.

In terms of only even rows or only odd rows, fields where the current programming is performed or not performed alternately exist, the light emitting period is provided in both cases. In other words, the light emitting scanning (or, light emitting of the organic EL device) is performed twice per one programming scanning (or, current programming). The light emitting scanning is performed in all rows in both the even and the odd field. The programming scanning is not performed in the odd rows in the even field, but the current data programmed in the preceding odd field is held, so that the data causes the organic EL device to emit light. This holds true in the even rows.

The present invention is characterized in that periods of the light emitting scanning which is performed twice are different from each other, and such different lengths of the periods are alternated between the odd and the even row.

Figure 5:
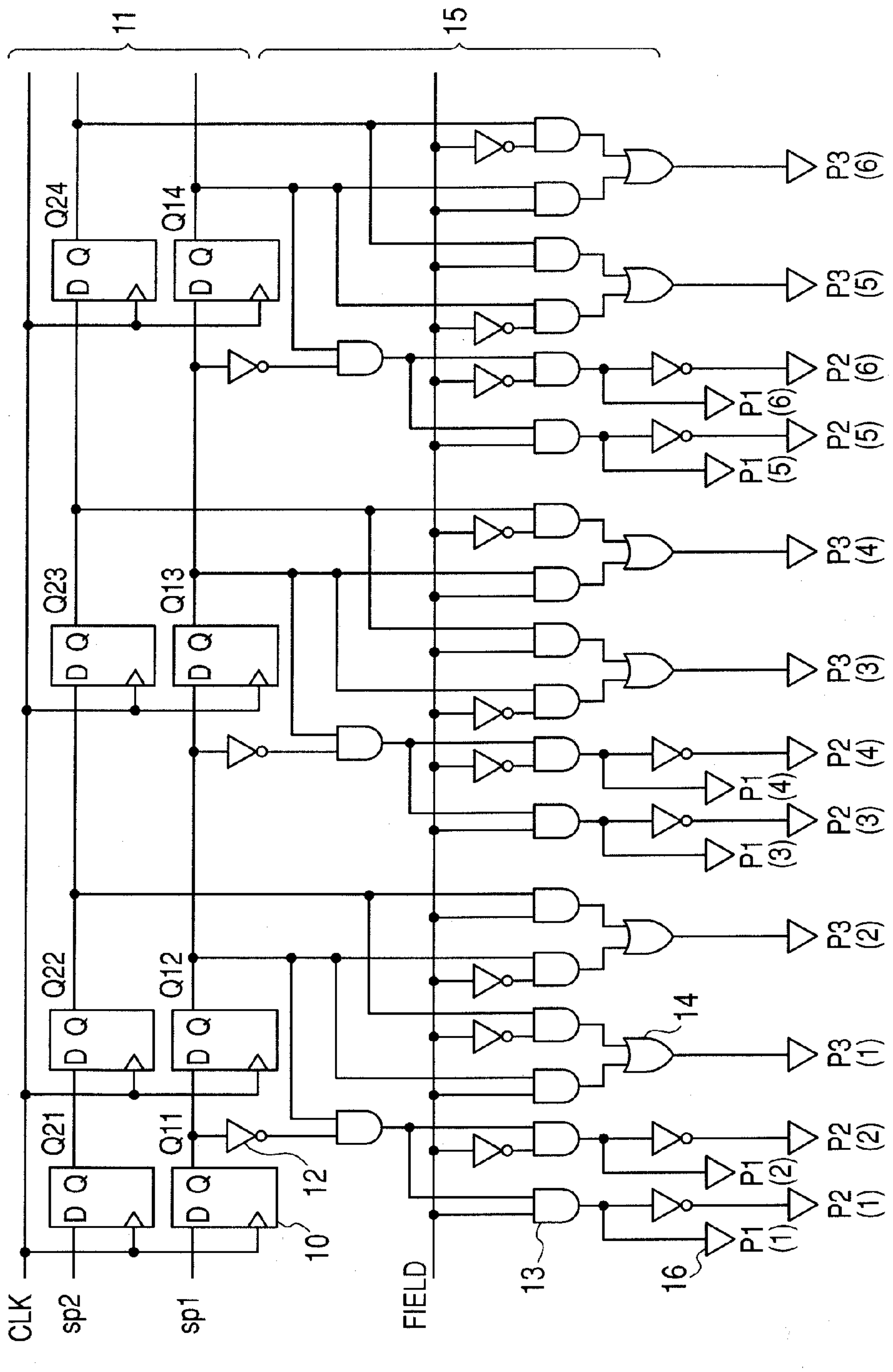
FIG. 5 is a circuit diagram illustrating one example of a row control circuit in the display apparatus in FIG. 1.

As illustrated in FIG. 5, in the odd field, the lighting signals P3 in the odd rows are placed in a low level for a period of T1, the lighting signals P3 in the even rows are placed in a low level for a period of T2 and the periods T1 and T2 are different in length. In addition, in the even field, the lighting signals P3 in the odd rows are placed in a low level for a period of T2, the lighting signals P3 in the even rows are placed in a low level for a period of T1 and the periods T1 and T2 are in reverse in length. That is to say, each row is subjected to the light emitting scanning so that the length of the light emitting period can be different between the light emitting period scanning in the field immediately after the programming scanning has been performed and in the field where programming scanning is not performed.

The length of a period for which current is supplied to the organic EL device is rendered different according to the light emitting brightness of the light emitting device (or, the organic EL device) which is being subjected to the light emitting scanning so that brightness can be leveled throughout one frame. In other words, the light emitting period is rendered short in the light emitting period with a higher brightness or the light emitting period is rendered long in the light emitting period with a lower brightness, out of the two light emitting scannings.

Thereby, even if the holding voltage on the capacitor C1 of the pixel circuit 2 is varied between fields where the current programming is performed or not performed to cause a difference in the light emitting wave height value of the organic EL device, an apparent brightness can be leveled.

The reason why brightness is different between the light emitting period immediately after the programming and the following light emitting period for which the programming is not performed is that current flowing into the organic EL device is different. The holding voltage of the capacitor 1 in the pixel circuit 2 is varied while the light emitting period in the field where the programming scanning is not performed is reached through the light emitting period of the T1 after the programming scanning has been performed, as a result, a difference is caused in the light emitting brightness of the organic EL device.

The reason the holding voltage is varied is that leak current flows through the transistor M2 which is being turned off to probably vary the electric charge of the holding capacitor C1.

The electric potential at the drain of the transistor M1 is substantially equal to the terminal voltage of the organic EL device when the transistor M4 is turned on to cause current to flow into the EL device. The voltage across the terminals of the EL device is different according to dispersion of characteristics of the EL device itself, deterioration and ambient temperature, so that the electric potential at the drain of the transistor M1 is not constant. When the drain potential of the transistor M1 is higher than the gate potential of the transistor M1, the leak current through the transistor M2 flows from the drain of the transistor M1 to the gate thereof, reducing the electric charge of the holding capacitor C1 to rise the gate potential of the transistor M1, that is, leading to reduction in current supplied to the EL device. In this case, the brightness of the EL device is decreased with time. Conversely, when the drain potential of the transistor M1 is lower than the gate potential of the transistor M1, the brightness of the EL device is increased with time.

This is attributed to the reason that the light emitting brightness of the EL device is increased or decreased depending on the time from the end of the programming scanning to the start of the light emitting scanning.

The display apparatus of the present embodiment includes a plurality of light emitting devices (or, organic EL devices) arranged in row and column directions, drive circuits for driving the light emitting devices, a plurality of scanning lines 5 for connecting the drive circuits in the row direction and a plurality of lighting lines 6 for connecting the drive circuits in the row direction. The display apparatus further includes a plurality of data lines 7 for connecting the drive circuits in the column direction.

The display apparatus of the present embodiment performs the programming scanning in which the plurality of data lines 7 are supplied with signals, the plurality of scanning lines 5 are sequentially selected and signals are set to the drive circuit. After the programming scanning has been performed, the display apparatus performs the light emitting scanning twice or more in which the plurality of lighting lines 6 are sequentially selected and a current corresponding to the set signal is supplied from the drive circuit to the light emitting device. The length of the period for which current is supplied is rendered different between the light emitting scanning immediately after the programming scanning has been performed and the light emitting scanning after that.

As described above, the present embodiment alternately performs the programming scanning in which the scanning lines in the odd rows are sequentially selected and the programming scanning in which the scanning lines in the even rows are sequentially selected. As illustrated in FIG. 4, after each programming scanning has been performed, the display apparatus performs the light emitting scanning in which the lighting lines 6 in both the odd and the even row are selected.

As illustrated in FIG. 4, in the light emitting scanning, the display apparatus simultaneously starts the period in which current is supplied in a pair of the adjacent odd and even rows (or, the start of T1 and T2 is the same). The light emitting device of the present embodiment is an electro-luminescence device (or, the organic EL device).

FIG. 5 is a circuit diagram illustrating one example of a row control circuit 3. In FIG. 5, the row control circuit 3 includes a shift register 11 formed of flip-flops 10. Each output of the shift register 11 is input to a logic circuit 15 formed of a NOT gate 12, an AND gate 13 and an OR gate 14. The logic circuit 15 outputs the scanning signals P1 and P2 and the lighting signal P3 through buffer 16. For the sake of simplicity, the outputs to the first to the sixth row are illustrated in FIG. 5.

Figure 6:
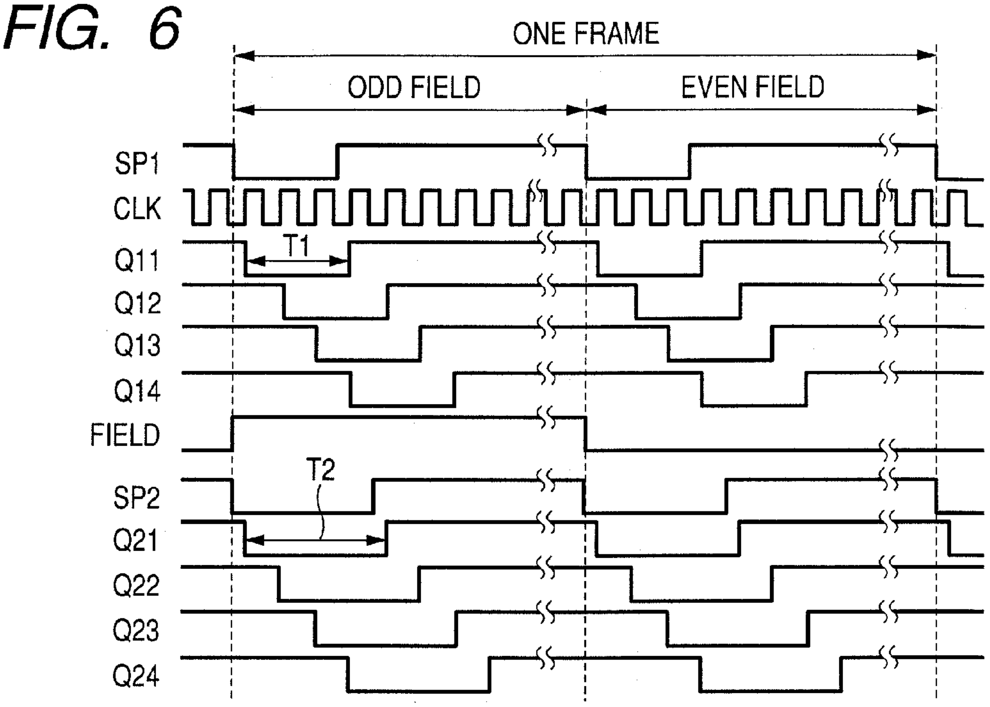
FIG. 6 is a timing chart illustrating the operation of the row control circuit in FIG. 5.

FIG. 6 is a timing chart describing the operation of the row control circuit 3 in FIG. 5. Start pulse signals SP1 and SP2 are input to the shift register 11. A clock signal CLK sequentially transfers the start pulse signal SP input to the shift register 11. One period of the clock signal CLK is taken as one horizontal scanning period.

Q11 to Q14 and Q21 to Q24 denote outputs from the flip-flops 10 in the shift register 11. A field signal "FIELD" discriminates between the odd and the even field. In the period for which the FIELD is placed in a high level, the current programming is performed in pixels in the odd rows. In the period for which the FIELD is placed in a low level, the current programming is performed in pixels in the even rows.

As can be seen from FIGS. 5 and 6, the scanning signals P1 and P2 in each row are formed of the outputs of the flip-flop 10 at the stage corresponding to the row in the shift register 11 and the flip-flop 10 at the following stage. The lighting signal P3 is formed of the output of the flip-flop 10 at the following stage.

The light emitting period is controlled by varying a pulse width of the period for which the start pulse signals SP1 and SP2 are placed in a low level to vary a pulse width of the period for which the lighting signal P3 is placed in a low level. In the period for which the field signal FIELD is placed in a high level, a pulse width of the period for which the start pulse SP1 is placed in a low level corresponds to a light emitting period in the odd rows and a pulse width of the period for which the start pulse SP2 is placed in a low level corresponds to a light emitting period in the even rows. In the period for which the field signal FIELD is placed in a low level, a pulse width of the period for which the start pulse SP2 is placed in a low level corresponds to a light emitting period in the odd rows and a pulse width of the period for which the start pulse SP1 is placed in a low level corresponds to a light emitting period in the even rows.

As illustrated in FIG. 3, the lighting signal P3 is changed over to the low level at the time t2 when a certain time has passed since the time t1 when the scanning signals P1 and P2 are changed over. This can be realized by rendering smaller the drive ability of the buffer for outputting the lighting signal P3 than that of the buffer for outputting the scanning signals P1 and P2. Alternatively, the number of stages of the buffer for outputting the lighting signal P3 may be increased to plural stages or capacitance may be added to provide a delay circuit.

Although the row control circuit with the configuration in FIG. 5 is exemplified in the present embodiment, but the present invention is not limited to the configuration. The row control circuit can be a configured to perform the drive method in FIG. 4. In addition, in the present embodiment, although one period of the clock signal CLK in the shift register is taken as one horizontal scanning period, but the present invention is not limited that depending on the configuration of the row control circuit.

As described above, in the present embodiment, the light emitting period is provided in each field while the current programming is being alternated between the odd and the even field. For this reason, for example, if the drive frequency of one field is taken as 60 Hz, the current programming is performed at 30 Hz (once a frame in each row), but light emitting can be performed at 60 Hz (once a field in each row).

That is to say, each pixel emits light twice for each current programming. Even if the amount of output current in the pixel circuit is varied between fields where the current programming is performed or not performed to cause a difference in the light emitting wave height value of the organic EL device, the light emitting period is adjusted to enable the apparent brightness to be leveled. The occurrence of the flicker can be thus suppressed. Furthermore, the drive frequency of light emitting and non-light emitting can be doubled from that of the current programming, and the apparent brightness in each field can be leveled to allow the occurrence of the flicker to be suppressed.

Second Embodiment

The second embodiment of the present invention is described below. The entire configuration of the display apparatus according to the present embodiment is the same as that in FIG. 1 and the pixel circuit and the drive method therefor are the same as those in FIGS. 2 and 3. The output waveforms of the lighting signals P3 are different from those of the first embodiment.

Figure 7:
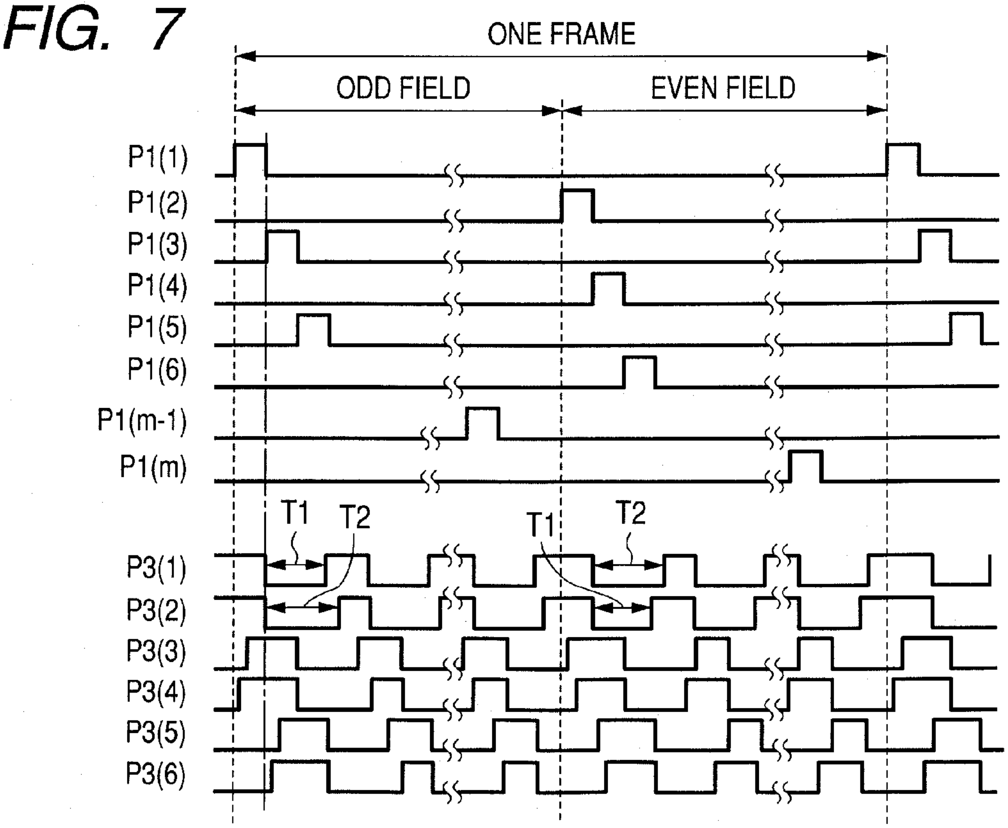
FIG. 7 is a timing chart illustrating the operation of the second embodiment of the present invention.

FIG. 7 is a timing chart illustrating the drive operation of the display apparatus of the present embodiment. In FIG. 7, P1(1) to P1(*m*) represent scanning signals P1 corresponding to the first row to the m-th row respectively. P3(1) to P3(*m*) signify the brightness control signals P3 corresponding to the first row to the m-th row respectively.

The scanning signals P2 are output at the same timing as that in FIG. 4.

The output waveforms of the lighting signals P3 are different from those in the timing chart in FIG. 4 of the first embodiment. The lighting signals P3 of the present embodiment are described in detail below.

In terms of the lighting signals P3 in the odd rows, in the odd field, plural short periods of the low level (T1) are provided after the current programming has been performed, and in the even field, plural long periods of the low level (T2) are provided after the current programming has been performed in the following row (or, in the even row).

On the other hand, in terms of the lighting signals P3 in the even rows, in the even field, plural short periods of the low level (T1) are provided after the current programming has been performed, and in the odd field, plural long periods of the low level (T2) are provided after the current programming has been performed in the preceding row (or, in the odd row).

As is the case with the first embodiment, the light emitting period is provided on both fields where the current programming is performed or not performed. In the light emitting period in the field where the current programming is not performed, light is emitted by current programmed at the preceding field. In the present embodiment, the light emitting and non-light emitting of the organic EL device are repeated several times for each programming scanning.

As is the case with the first embodiment, the length of a period for which current is supplied to the organic EL device is set so that brightness is leveled throughout one frame. In other words, the light emitting period is rendered short in the light emitting period with a higher brightness or rendered long in the light emitting period with a lower brightness.

As described above, the present embodiment performs the light emitting scanning several times in which the scanning lines are sequentially selected to supply current to the light emitting devices for a certain period of time (or, a period of T1 or T2 in FIG. 7) in both fields of the programming scanning in which scanning lines in odd rows in the first half of one frame period are sequentially selected and scanning lines in even rows in the second half of one frame period are sequentially selected.

The length of a period for which current is supplied in the light emitting scanning in the odd field is made different from the length of a period for which current is supplied in the light emitting scanning in the even field. That is to say, several periods T1 are different in length from several periods T2 in FIG. 7. In other words, there exist 2N periods (where, N is an integer of two or more) for which current is supplied to the EL device in one frame period. The period for which current is supplied in the first half of the 2N is different in length from that in the second half of the 2N.

Also in the present embodiment, even if the amount of output current in the pixel circuit is varied between fields where the current programming is performed or not performed to cause a difference in the light emitting wave height value of the organic EL device, the light emitting period is adjusted to enable the apparent brightness to be leveled. Thus, the apparent brightness in the fields where the current programming is performed or not performed can be leveled with the drive frequency of light emitting and non-light emitting increased, so that the occurrence of the flicker can be suppressed.

A plurality of the light emitting periods are provided in each field while the current programming is being alternated between the odd and the even field. For this reason, if the drive frequency of one field is taken as 60 Hz, the current programming is performed at 30 Hz (once a frame in each row), but light emitting can be performed at more than 60 Hz (more than once in each field in each row). This is also effective in suppressing the flicker.

The row control circuit in the present embodiment may be a configuration capable of performing the drive method in FIG. 7. For example, a circuit for controlling the scanning signals P1 and P2 may be separated from a circuit for controlling the lighting signal P3.

The period T1 may be equal in length to the period T2 instead of varying the periods T1 and T2, and the number of times of the light emitting periods may be adjusted in each field. That is to say, the number of times of the period for which current is supplied can be made different between the light emitting scanning immediately after the programming scanning has been performed and the light emitting scanning after that. In this case, however, a circuit is needed to separately perform the light emitting scanning in the odd and the even row.

In the first and the second embodiment, although a method of performing programming in the pixel circuit by the interlace scanning is described, the present invention is not limited to the embodiments. For example, current is set to all pixel circuits in a certain field A and then light is emitted in the following field B according to the value set to the pixel circuits in the preceding field. At this point, the light emitting period in the field B is made different from the light emitting period in the field A in both even and odd rows. Thereby, even if the amount of output current in the pixel circuit is varied to cause a difference in the light emitting wave height value of the organic EL device, the light emitting period is adjusted to enable the apparent brightness to be leveled.

Third Embodiment

Figure 8:
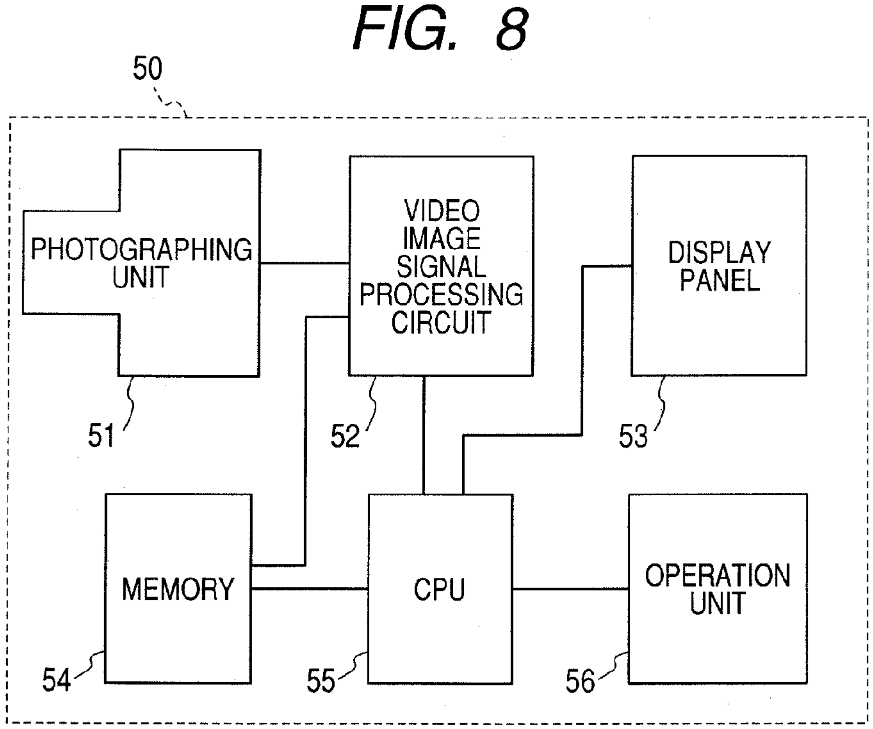
FIG. 8 is a block diagram illustrating one embodiment of a digital still camera system using the display apparatus of the present invention.
Figure 9:
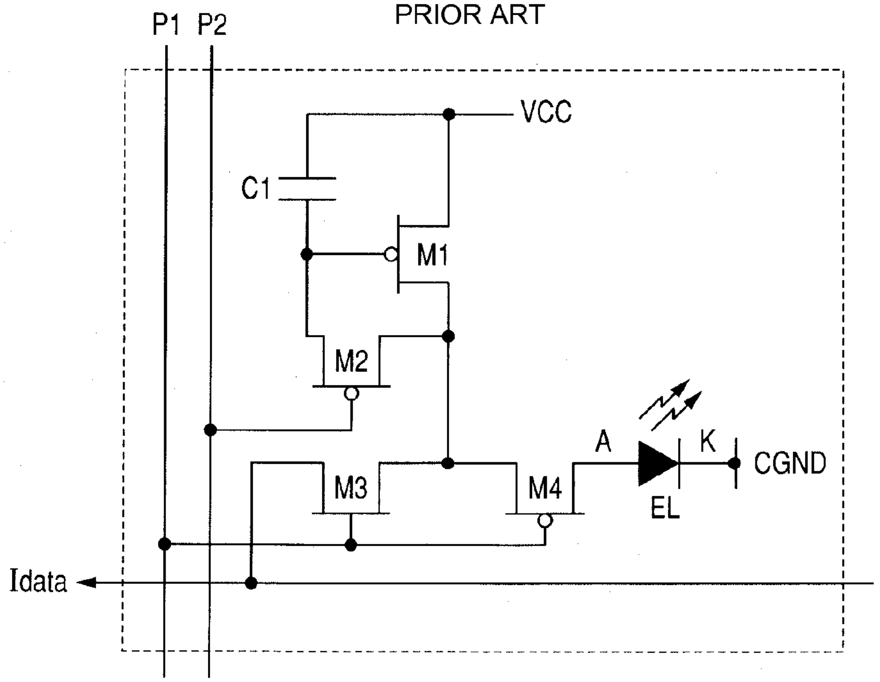
FIG. 9 PRIOR ART
FIG. 9 is one example of a conventional pixel circuit.
Figure 10:
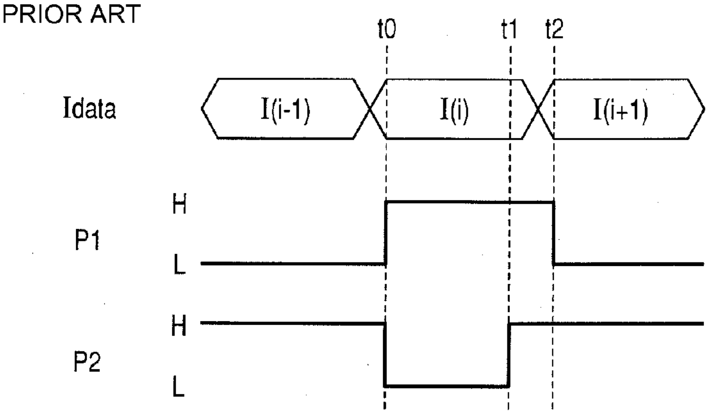
FIGURE 10 PRIOR ART
FIG. 10 is a timing chart illustrating the operation of the pixel circuit in FIG. 9.
Figure 11:
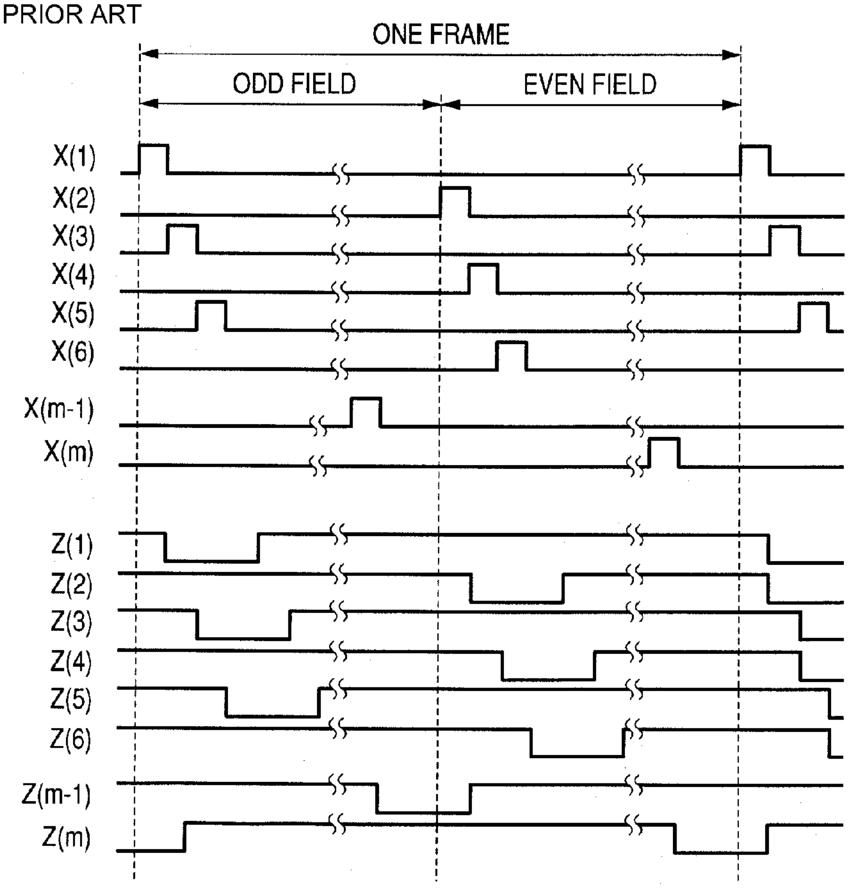
FIGURE 11 PRIOR ART
FIG. 11 is a timing chart illustrating the operation of a conventional display apparatus.

An electronic device using the above display apparatus according to the present invention is described below. FIG. 8 is a block diagram illustrating one example of a digital still camera system according to the present invention. In the figure, a digital still camera system 50 includes a photographing unit 51, a video image signal processing circuit 52, a display panel 53, a memory 54, a CPU 55 and an operation unit 56. The display panel 53 uses the display apparatus of the present invention as a display unit.

In FIG. 8, a video image picked up by the photographing unit 51 or a video image recorded in the memory 54 are subjected to a signal processing by the video image signal processing circuit 52 and displayed on the display panel 53. The CPU 55 controls the photographing unit 51, the memory 54 and the video image signal processing circuit 52 through the input from the operation unit 56 to cause the digital still camera system to perform image pickup, record, reproduction and display suited for situations.

The display apparatus of the present invention can be suitably used as the display unit for various electronic devices such as, for example, a cellular phone, a portable computer and a video camera in addition to the above. As described above, these electronic devices have the display apparatus of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-161208, filed Jun. 19, 2007, which is hereby incorporated by reference herein in its entirety.

The invention claimed is:

1. A display apparatus, in which a frame is formed of at least a first field and a second field, comprising:

a plurality of light emitting devices arranged in row and column directions;

drive circuits for driving the light emitting devices;

a plurality of scanning lines and a plurality of lighting lines connecting the drive circuits in the row direction;

a plurality of data lines connecting the drive circuits in the column direction; and a control circuit for controlling the scanning lines, the lighting lines, and the data lines, wherein the control circuit performs, while providing the data lines with signals, a first programming scanning in which predetermined scanning lines, among the plurality of scanning lines, are sequentially selected and the signals are set to the drive circuits connected to the selected scanning lines in the first field, and a second programming scanning in which scanning lines other than the predetermined scanning lines, among the plurality of scanning lines, are sequentially selected and the signals are set to the drive circuits connected to the selected scanning lines in the second field, the control circuit performs at least once in each of the first field and the second field a light emitting scanning in which the plurality of lighting lines corresponding to all of the plurality of scanning lines are sequentially selected to supply currents corresponding to the signals set to the drive circuits from the drive circuit connected to the selected lighting lines to the light emitting devices, the control circuit controls a length of a first period for which currents are supplied from the drive circuits connected to the predetermined scanning lines selected in the first programming scanning to the light emitting devices to be different from a length of a second period for which the currents are supplied from the drive circuits connected to the scanning lines selected in the second programming scanning other than the predetermined scanning lines to the light emitting devices, in the light emitting scanning performed at least once in each of the first field and the second field, and the control circuit varies the length of the first period and the second period for which the currents are supplied from the drive circuits connected to the selected lighting lines to the light emitting devices, according to the light emission brightness of the light emitting device in the first period and the second period.

2. The display apparatus according to claim 1, wherein the control circuit alternately performs the first programming scanning in which scanning lines in odd rows are sequentially selected and the second programming scanning in which scanning lines in even rows are sequentially selected, and the control circuit performs the light emitting scanning in which the length of the first period and the second period for which the currents are supplied from the drive circuits connected to the selected lighting lines to the light emitting devices is different between the odd and the even row after each of the first programming scanning and the second programming scanning has been performed.

3. The display apparatus according to claim 2, wherein the control circuit simultaneously starts a period for which the current in an odd row of a pair of adjacent odd and even rows is supplied and a period for which the current in an even row of the pair of adjacent odd and even rows is supplied, in the light emitting scanning.

4. The display apparatus according to claim 1, wherein the control circuit performs, while performing the first programming scanning and the second programming scanning respectively once, the light emitting scanning 2N times, where N is an integer of two or more, and a period for which the currents are supplied from the drive circuits connected to the selected lighting lines to the light emitting devices in the first half of 2N times in the light emitting scanning is different in length from a period for which the currents are supplied in the second half of 2N times in the light emitting scanning.

5. The display apparatus according to claim 1, wherein the light emitting device is an electro-luminescence device.

6. An electronic device comprising the display apparatus according to claim 1.

7. A display apparatus, in which a frame is formed of at least a first field and a second field, comprising:

a plurality of light emitting devices arranged in row and column directions;

drive circuits for driving the light emitting devices;

a plurality of scanning lines and a plurality of lighting lines connecting the drive circuits in the row direction;

a plurality of data lines connecting the drive circuits in the column direction; and a control circuit for controlling the scanning lines, the lighting lines, and the data lines, wherein the control circuit performs, while providing the data lines with signals, a first programming scanning in which predetermined scanning lines, among the plurality of scanning lines, are sequentially selected and the signals are set to the drive circuits connected to the selected scanning lines in the first field, and a second programming scanning in which scanning lines other than the predetermined scanning lines, among the plurality of scanning lines, are sequentially selected and the signals are set to the drive circuits connected to the selected scanning lines in the second field, the control circuit performs at least once in each of the first field and the second field a light emitting scanning in which the plurality of lighting lines corresponding to all of the plurality of scanning lines are sequentially selected to supply currents corresponding to the signals set to the drive circuits from the drive circuit connected to the selected lighting lines to the light emitting devices, the control circuit controls a length of a first period for which currents are supplied from the drive circuits connected to the predetermined scanning lines selected in the first programming scanning to the light emitting devices to be different from a length of a second period for which the currents are supplied from the drive circuits connected to the scanning lines selected in the second programming scanning other than the predetermined scanning lines to the light emitting devices, in the light emitting scanning performed at least once in each of the first field and the second field, in the light emitting scanning in the first field, the control circuit makes the length of the first period for which the currents are supplied from the drive circuits connected to the predetermined scanning lines selected in the first programming scanning to the light emitting devices shorter than the length of the second period for which the currents are supplied from the drive circuits connected to the scanning lines selected in the second programming scanning other than the predetermined scanning lines to the light emitting devices, and in the light emitting scanning in the second field, the control circuit makes the length of the second period for which the currents are supplied from the drive circuits connected to the scanning lines selected in the second programming scanning other than the predetermined scanning lines to the light emitting devices shorter than the length of the first period for which the currents are supplied from the drive circuits connected to the predetermined scanning lines selected in the first programming scanning to the light emitting devices.

* * * * *